United States Patent
Hu et al.

(10) Patent No.: US 10,419,125 B1
(45) Date of Patent: Sep. 17, 2019

(54) DYNAMIC GAIN EQUALIZER

(71) Applicant: Molex, LLC, Lisle, IL (US)

(72) Inventors: Gongjian Hu, Marina, CA (US); Lifu Gong, San Jose, CA (US); Yi Liao, San Jose, CA (US); Tian Zhu, Castro Valley, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/005,257

(22) Filed: Jun. 11, 2018

(51) Int. Cl.
*H04B 10/564* (2013.01)
*H04B 10/2507* (2013.01)

(52) U.S. Cl.
CPC ..... *H04B 10/564* (2013.01); *H04B 10/25073* (2013.01)

(58) Field of Classification Search
CPC . H04B 10/564; H04B 10/25073; H04J 14/02; H04J 14/0227; H04J 14/0221; H04J 14/0212; H04J 14/0283
See application file for complete search history.

(56) References Cited

U.S. PATENT DOCUMENTS

2013/0234047 A1* 9/2013 Jaffe ............... G01N 21/6408
250/459.1
2015/0212275 A1* 7/2015 Mao ............... G02B 6/29311
385/11

* cited by examiner

*Primary Examiner* — Ted M Wang
(74) *Attorney, Agent, or Firm* — Molex, LLC

(57) ABSTRACT

A dynamic gain equalizer (DGE) for an optical communication device and related method which are capable of reducing power variations among wavelength division multiplexing (WDM) signals. The DGE and method use an optical attenuation device configured such that the ratio of pixel gap distance to the channel beam diameter at the point of incident to the optical attenuation device is less than or equal to 0.06. The DGE can produce output signal sets that have ripple increases of less than 0.1 db over the input signal sets.

19 Claims, 16 Drawing Sheets

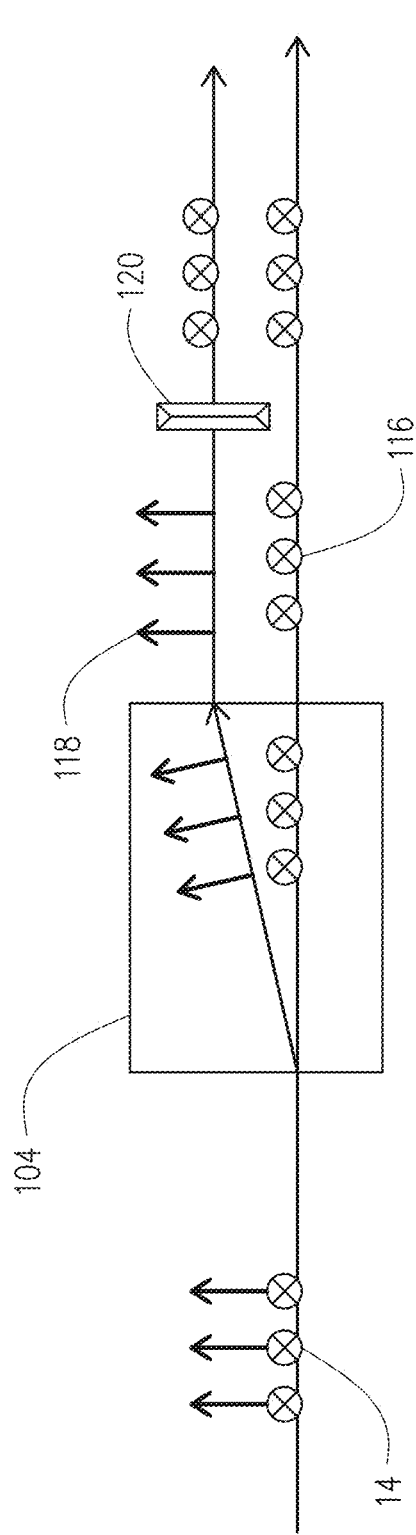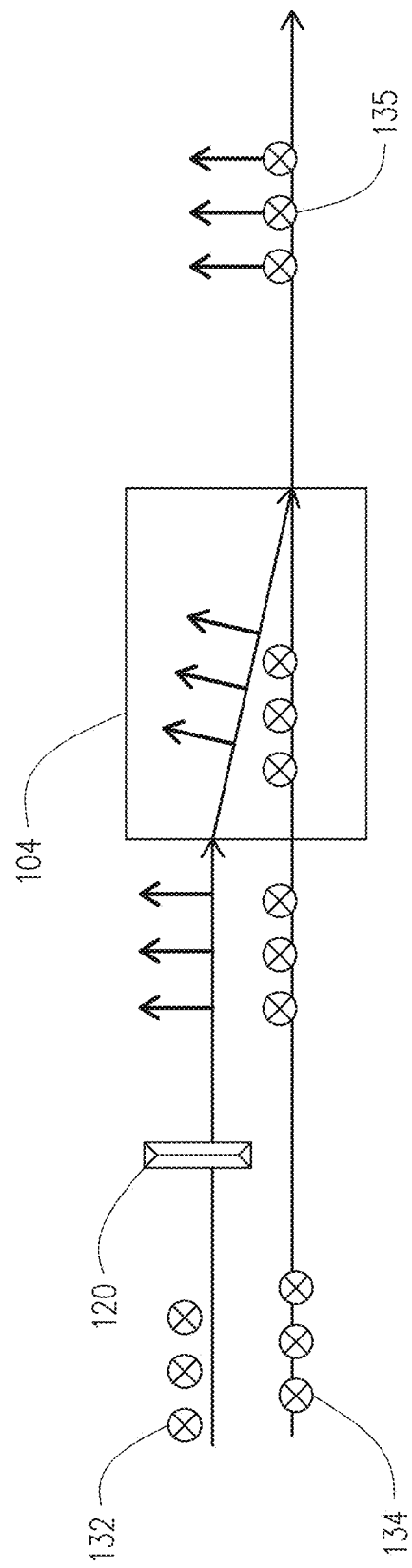

DYNAMIC GAIN EQUALIZER

TECHNICAL FIELD

This disclosure relates generally to the field of optical communications and more specifically to dynamic gain equalization for optical communication amplification systems.

BACKGROUND

In wavelength division multiplexing (WDM), a plurality of optical signals or channels are carried over a single optical fiber with each channel being assigned a particular wavelength. Optical signals or channels in a WDM system are frequently transmitted over optical fibers, which typically can transmit signals over distances of approximately 50-100 km without significant attenuation. For distances beyond 100 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers (EDFA) do not uniformly amplify light within the spectral region of 1525 to 1580 nm. For example, an optical channel at a wavelength of 1540 nm is typically amplified 4 dB more than an optical channel at a wavelength of 1555 nm. While such a variation in gain can be tolerated for a system with only one optical amplifier, it cannot be tolerated for a system with plurality of optical amplifiers or numerous, narrowly-spaced optical channels. In which case, much of the pump power supplies energy for amplifying light at the high gain wavelengths rather than amplifying the low gain wavelengths. As a result, low gain wavelengths suffer excessive noise accumulation after propagating through several amplifiers.

Accordingly, fixed gain flat filters (GFF) and other optical equalizers have been used to balance the gain of EDFA systems. However, due to GFF's spectrum ripple behavior, the unflatness across channels become much more pronounced after multi-stages of EDFA amplification. Eventually, the ripple behavior makes a part of the channels unacceptable. Accordingly, gain equalization that equalizes all channels without introducing a ripple effect or with minimal ripple effect is needed.

Further, EDFA systems are limited to use primarily with C-band signals (1530 nm to 1565 nm). However, to meet exponentially increasing data transmission demands of big data and cloud storage, utilizing wider signal bandwidth beyond transitional C-band have been proposed. As a practical means of increasing the bandwidth, extending to L-band is currently the most realistic candidate. Generally, Raman-type amplifiers are used with L-band (1565 nm to 1625 nm) signals based on their superior amplification at L-band frequencies. Unfortunately, the GFF and optical equalizers used with EDFA systems generally are not applicable to Raman-type amplification, and if used, result in even more severe rippling problems than occur with C-band signals.

SUMMARY

Consistent with the present disclosure, an optical dynamic gain equalizer (DGE) is provided. The DGE has an adjustable, wavelength dependent transmission spectrum configured to equalize the signal set across the plurality of wavelengths to produce an output signal set. The DGE is designed to mitigate the multistage gain ripple accumulation and degradation in the optical signal to noise ratio across signals in both the C-band and L-band.

The dynamic gain equalizer of one embodiment comprises an input port, an output port, an optical system and an optical attenuation device. The input port receives an input signal set from the optical communication path. The input signal comprises a plurality of optical signals. Each optical signal is at a respective one of a plurality of wavelengths with each of the wavelengths having a power level. The optical output port is configured to transmit an output signal set from the optical system to the optical communication path.

The optical system is configured to separate the input signal set into spatially separated channel beams based on wavelength and based on polarization components for each of the wavelengths. Each of the channel beams has an optical power. The optical system is further configured to reintegrate an attenuated channel beam set so as to produce an output signal set. The output signal set has a flattened spectrum from the input signal set such that the power levels across the plurality of wavelengths has been equalized.

The optical attenuation device is configured to receive the channel beams incident on the optical attenuation device from the optical system. The optical attenuation device attenuates the optical power of one or more of the channel beams so as to produce the attenuated channel beam set. The optical attenuation device is configured to transmit the attenuated channel beam set to the optical system.

In some embodiments, the optical attenuation device comprises a matrix of pixels divided into a plurality of pixel sets with each of the pixel sets having one or more pixels. Each of the channel beams is associated with a corresponding one of the pixel sets in a one-to-one relationship such that a first channel beam is associated with a first pixel set and a second channel beam is associated with a second pixel set. In such embodiment, the matrix of pixels can be divided by a gap distance "g". The optical attenuation device and optical system can be configured such that each of the channel beams has a diameter "d" when the channel beam is incident on the optical attenuation device, and configured such that the ratio g/d is less than or equal to 0.06. In some embodiments, the optical attenuation device and the optical system are configured such that the ratio g/d is less than or equal to 0.04 or less than or equal to 0.037.

In some embodiments, the optical system comprises a compact planar array of optical elements and a mirror. The compact planar array of optical elements is configured to separate the input signal set into the spatially separated channel beams and configured to reintegrate the attenuated channel beam set so as to produce the output signal set. The optical elements are arranged such that the planar array is a folded optical system having a zigzag beam path lying in a single plane. The mirror is configured to redirect the spatially separated channel beams so as to be incident on an incident face of the optical attenuation device, wherein the incident face is parallel to the single plane.

Further, the compact planar array of optical elements can comprise a collimator, a polarization splitter, a polarization rotator, a wavelength separator, and one or more lenses. The collimator is configured to collimate the input signal set and transmit the input signal set along the beam path. The polarization splitter is disposed in the beam path and is configured to split the input signal set into a pair of polarization components for each of the wavelengths. The polarization rotator is disposed in the beam path and configured to rotate one of the pair of polarization components. The wavelength separator is disposed in the beam path and configured to spatially separate the plurality of wavelengths into the channel beams. The one or more lenses are disposed in the beam path and configured to focus the channel beams such that the channel beams have the diameter "d" when the channel beams are incident on the optical attenuation device.

Also consistent with this disclosure, method of manipulating an input signal set formed from a plurality of optical signals is provided. Each optical signal is at a respective one of a plurality of wavelengths with each of the wavelengths having a power level. The method includes the following steps:

separating the input signal set into spatially separated channel beams based on wavelength and based on polarization components for each of the wavelengths, wherein each of the channel beams has an optical power; and attenuating the optical power of one or more of the channel beams so as to produce an attenuated channel beam set.

In such embodiments, the step of attenuating the optical power comprises impinging the channel beams on a surface of an optical attenuation device. The optical attenuation device can comprise a matrix of at least 40 pixels and each pixel can be independently electrically driven. In some embodiments, the matrix will be comprised of at least 50 pixels. The variable optical attenuation range of each pixel can reach from 0 to 30 db.

Each of the channel beams can have a diameter "d" when the channel beam is incident on the optical attenuation device. The matrix of pixels can be divided by a gap distance "g" and the optical attenuation device and the optical system are configured such that the ratio g/d is less than or equal to 0.06.

In some embodiments, the method further comprises reintegrating the attenuated channel beam set so as to produce an output signal set, wherein the output signal set has a flattened spectrum from the input signal set such that the power levels across the plurality of wavelengths has been equalized. Typically, the output signal set has an increase in spectral ripple over the input signal set that is 0.1 db or less.

In some of the above embodiments, the ratio g/d is less than or equal to 0.04 or is less than or equal to 0.037.

BRIEF DESCRIPTION OF THE DRAWINGS

The present invention is illustrated by way of example and not limited in the accompanying figures in which like reference numerals indicate similar elements and in which:

FIG. 7 is a schematic representation of splitting of light into two beams by a polarization separator and polarization rotator system in accordance with embodiments of this disclosure.

FIG. 8 is a schematic view of reintegrating light into a single beam by a polarization separator and polarization rotator system in accordance with embodiments of this disclosure.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Figure 1:
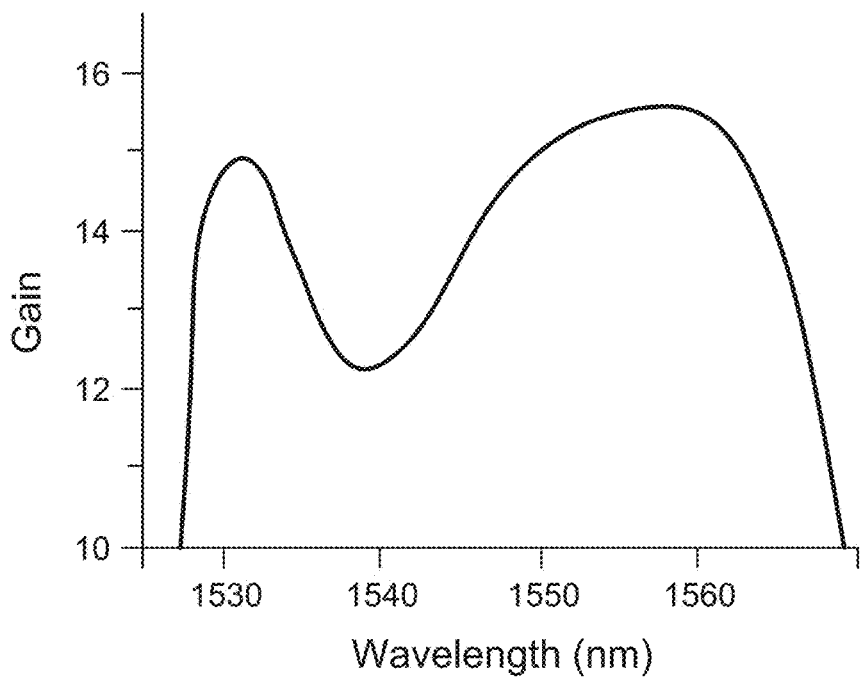
FIG. 1 is a diagram illustrating a typical gain profile for an erbium doped fiber amplifiers (EDFA) over a typical wavelength spectrum.
Figure 2:
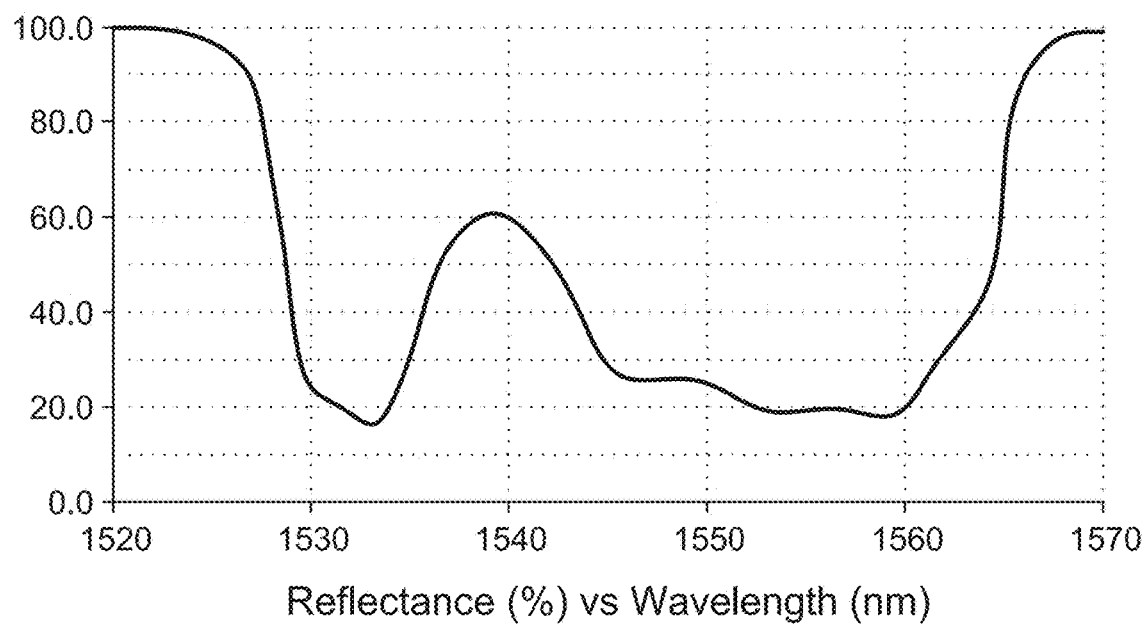
FIG. 2 is a diagram illustrating a reflection spectrum of a typical fixed gain flat filter (GFF).
Figure 3:
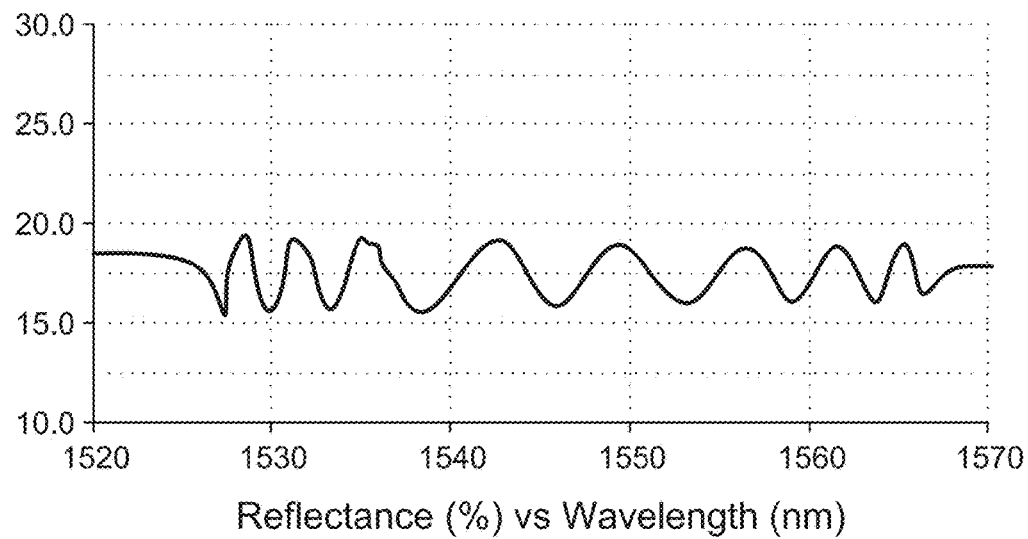
FIG. 3 is a diagram illustrating the output power ripple form one stage of EDFA amplification and GFF flattening.

A dynamic gain equalizer (DGE) and related method are provided for reducing power variations among wavelength division multiplexing (WDM) signals. Typically, fixed gain flat filters (GFF) have been used in conjunction with erbium doped fiber amplifiers (EDFA). The GFFs are used to flatten or equalize the amplitude of the amplified signal since EDFAs do not amplify wavelengths equally over the operable wavelength spectrum used by optical communication systems. For example, FIG. 1 illustrates a gain profile for an EDFA over a typical wavelength spectrum. FIG. 2 illustrates a reflection spectrum of a typical GFF. As will be realized, the GFF spectrum complements the EDFA spectral gain so that the beaks in one matches troughs in the other. Thus, the GFF will flatten the EDFA spectrum so that the gain is more equal across the operable wavelength spectrum. However, as will also be realized, the match between EDFA spectral gain and GFF do not exactly mirror each other. Further, GFF devices do not compensate for changes in the EDFA spectral gain, such as changes due to temperature fluctuations. Accordingly, the output from a typical GFF and EDFA systems contain a ripple. A typical output power ripple from a single stage of GFF flattening is illustrated in FIG. 3. As illustrated, the rippling generally is about +/−0.5 db or greater. Further, most optical communication systems have many such stages of amplification and flattening, and the rippling add for each such stage. Thus, the ripple after N stages will be 0.5×N db.

The present disclosure overcomes these problems by providing for dynamic gain equalizer which can limit the rippling added by each flattening stage to most generally +/−0.4 db or less, and more typically +/−0.2 db or less, or +/−0.1 db or less. In some embodiments, the rippling added at each stage can be from +/−0.02 db to +/−0.1 db.

Figure 4:
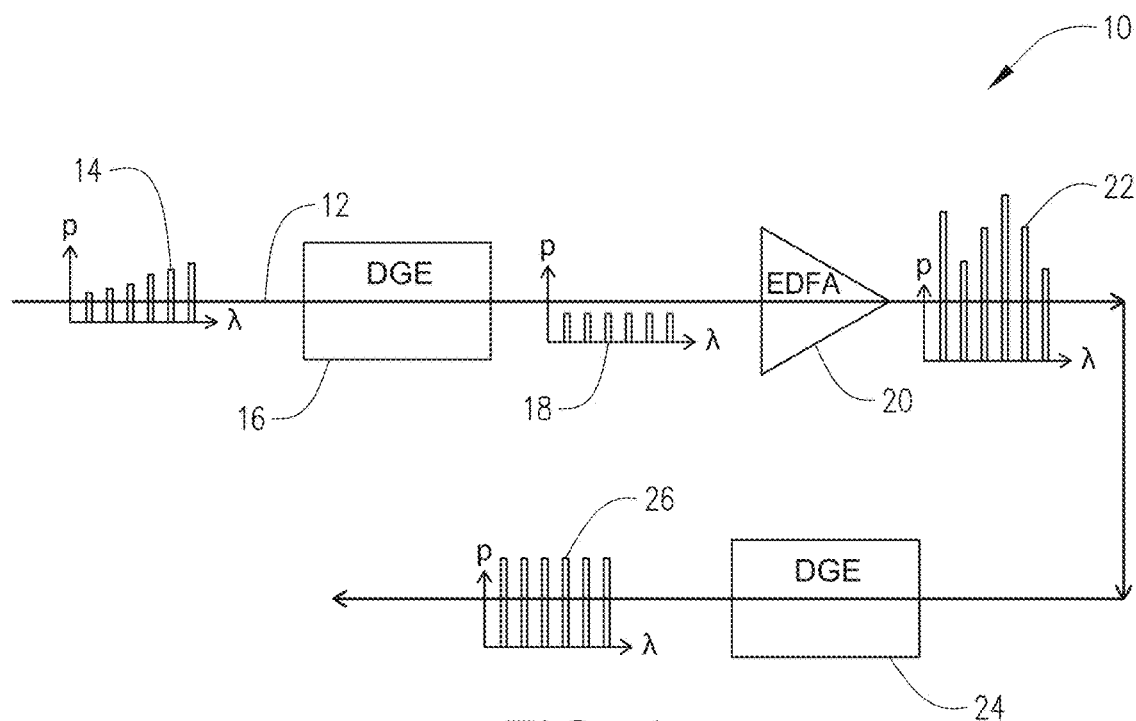
FIG. 4 is a schematic illustration of a portion of an optical communication network utilizing a pair of DGEs in accordance with the current disclosure.

Turning now to FIG. 4, a portion of an optical communication network 10 utilizing a pair of DGEs in accordance with the current disclosure is schematically illustrated. In particular, system 10 is a signal amplification portion of the optical communication network, such as might be used to amplify a wavelength division multiplexing (WDM) optical signal that is being transmitted over large distances (typically greater than about 100 km). System 10 includes a first DGE 16 coupled to an optical communication path 12 carrying WDM optical signals. However, the power across the wavelengths is not flat because of various factors, such as variation in transmission efficiencies in the optical fibers of the network. First DGE 16 is coupled to path 12 so as to receive an input signal set 14 comprising plurality of optical signals. Each optical signal is at a respective one of a plurality of wavelengths. First DGE 16 has an adjustable, wavelength dependent transmission spectrum configured to equalize the signal set across the plurality of wavelengths to produce a first output signal set 18. The first DGE adjusts the power associated with each channel (signal wavelength) on substantially a channel-by-channel basis so that the WDM optical signal has a desired power spectrum. Thus, first output signal set 18 is flattened or equalized so that the power of each wavelength is about equal. Thus, the signal strength across the wavelength spectrum of the first output signal set 18 is approximately equal.

First output signal set 18 is then introduced into an amplifier 20, such as erbium-doped fiber amplifiers (EDFA) as are known in the art. Amplifier 20 amplifies the signal set power across the wavelength spectrum. As described above, the amplification of the signal set will typically have power variations among the different wavelength signals making up the signal set's signals. That is signals at certain wavelengths will be amplified more than the signals at other wavelengths. Accordingly, amplified signal set 22 coming from amplifier 20 has power variations among the different wavelengths.

The amplified signal set 22 is introduced to a second DGE 24, which is used to correct these variations or to "flatten" the signal set. Like, first DGE 16, second DGE 24 has an adjustable, wavelength dependent transmission spectrum configured to equalize the signal set across the plurality of wavelengths to produce a second output signal set 26. Second output signal set 26 is flattened or equalized so that the power of each wavelength is about equal. Thus, the signal strength across the wavelength spectrum of second output signal set 26 has been increased over input signal set 14 and has been flattened so that second output signal set 26 has approximately equal power across the plurality of wavelengths.

Generally, DGEs in accordance with this disclosure comprise an optical system and an optical attenuation device. The optical system is configured to separate the input signal set into spatially separated channel beams based on wavelength and based on polarization components for each of the wavelengths. These spatially separated channel beams are introduced to the optical attenuation device.

The optical attenuation device is configured to receive the channel beams incident on the optical attenuation device from the optical system. The optical power of one or more of the incident channel beams are attenuated so as to produce the attenuated channel beam set. The attenuated channel beam set is transmitted to the optical system for reintegration. While some embodiments can use different optical components for the reintegration, the optical system specially disclosed herein uses the same optical components to separate the input signal set into separate channel beams and to reintegrate the attenuated separate channel beams into an output signal set. As will be appreciated from the discussion below, the reintegration takes the attenuated separate channel beams and reintegrates them to produce a non-polarized or random polarized output signal set.

Figure 5:
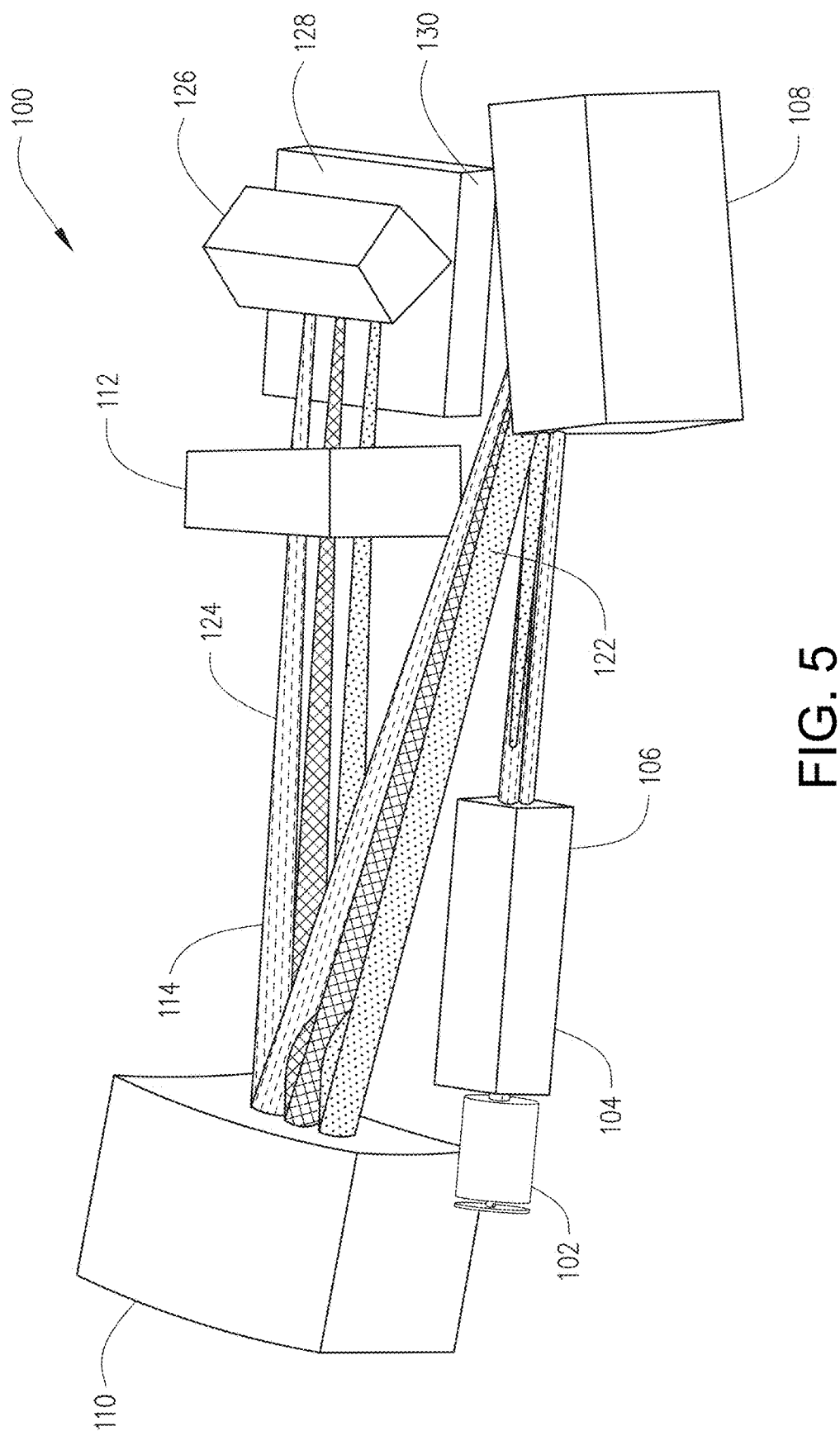
FIG. 5 is a schematic illustration of a DGE in accordance with embodiments of this disclosure.
Figure 6:
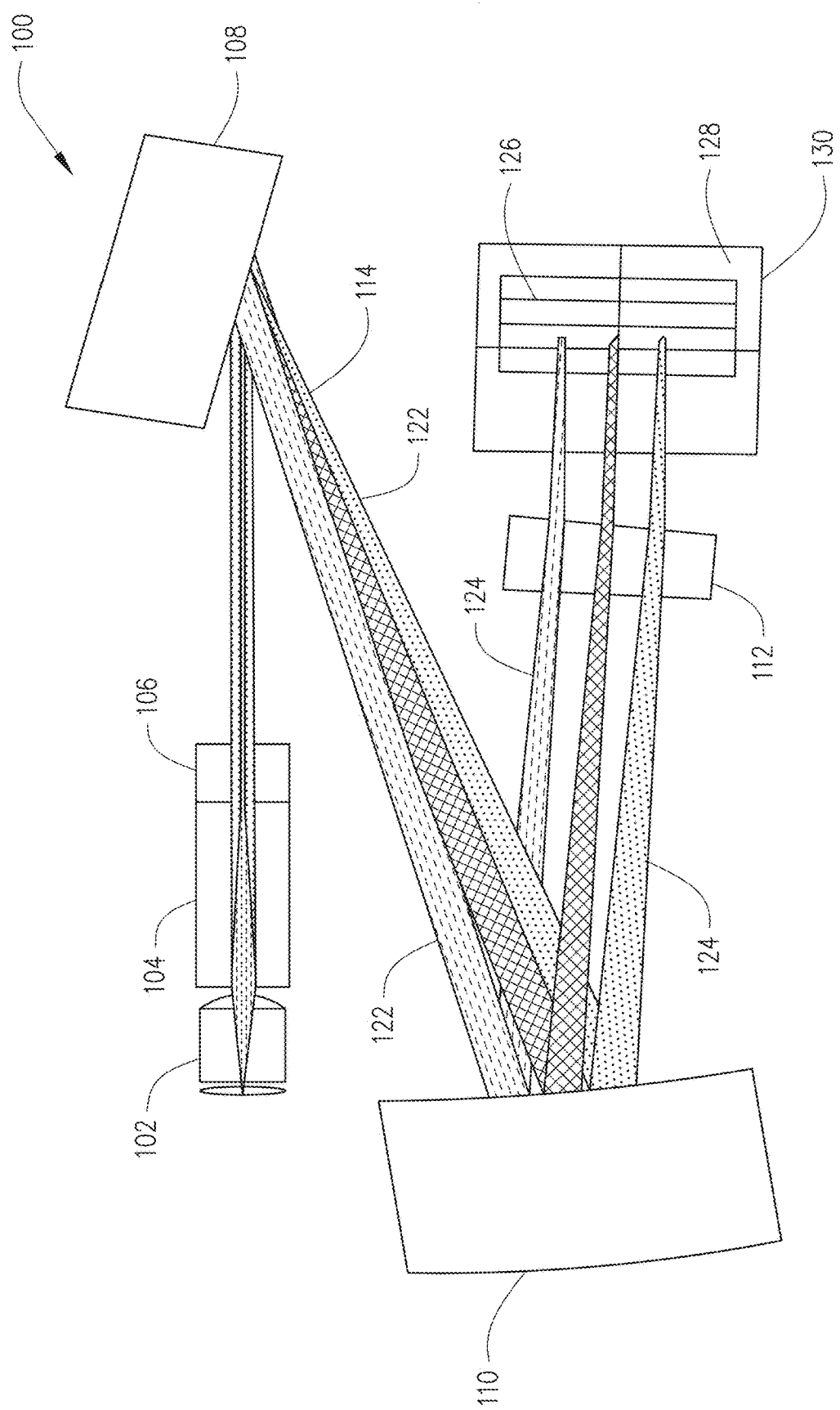
FIG. 6 is a schematic top-view of the DGE illustrated in FIG. 5

Turning now to FIGS. 5 and 6, a DGE 100 suitable for use as first DGE 16 and second DGE 24, and in accordance with this disclosure is illustrated. DGE 100 has an optical system comprising a collimator 102, a polarization splitter 104, a polarization rotator 106, a wavelength separator 108, and one or more lenses 110 and 112, which together form a compact planar array of optical elements. As will be appreciated from FIGS. 5 and 6, the optical elements are arranged such that the planar array is a folded optical system having a zigzag beam path 114 laying in a single plane.

Collimator 102 is configured to collimate the input signal set and transmit the input signal set along beam path 114. For example, collimator 102 can be one or more C-lenses.

Polarization splitter 104 is disposed in the beam path and is configured to split the input signal set into a pair of polarization components for each of the wavelengths. The input optical signals from collimator 102 are aligned parallel but can have random polarization. The input optical signal is introduced into polarization splitter 104 where s and p polarization component beams of orthogonal orientation diverge at a small angle. Polarization splitter 104 can for example be a Wollaston-type splitter. Polarization splitter 104 feeds the diverging signals of s and p polarization through an adjacent polarization rotator 106, which includes a half waveplate for rotating only one component. For example, the p polarization component can be rotated into alignment with the s polarization component. Polarization rotator 106 can include a path equalization element, which presents a different optical path for each of the beams and aligns their direction but does not alter the polarization state. The operation of polarization splitter 104 and polarization rotator 106 is shown schematically in FIG. 7, where the input signal set 14, which has been collimated, is split into s polarization component 116 and p polarization component 118. After splitting, the two component beams are aligned in direction and p polarization component is rotated at half waveplate 120 so that both component beams are now s polarization.

Returning to FIGS. 5 and 6, the beams from polarization rotator 106 impact on wavelength separator 108, which is a wavelength dispersive element, such as a grating, grism or arrayed waveguide grating. For example, wavelength separator 108 can be grating prism combination known commonly as a grism, operating in the reflective orientation. The grism is a combination of two common optical elements which are bonded together, namely a wedged prism, and a diffraction grating which can be of either the transmission or reflection type. In the embodiments described herein, the diffraction grating is a reflection grating and the beams traverse a double pass through the prism; however, it would be possible for a person skilled in the art to implement the current system utilizing a grism element with the grating operating in transmission mode. Operating in a reflection mode facilitates the optical system being a compact folded system.

As will be realized, wavelength separator 108 separates the polarized signals such that there is spatial separation of the signals by wavelengths, which are referred to herein as channel beams 122. Channel beams 122 are the dispersed spectrum from wavelength separator 108. Consequentially, the polarized state of each channel beam can be modulated independently in the optical attenuation device, as described below.

Channel beams 122 from wavelength separator 108 are then introduced into one or more lenses 110 and 112, which operate to focus the channel beams into parallel, spatially-separated channel beams 124. These beams 124 are then reflected by mirror 126. Mirror 126 operates to redirect spatially separated channel beams 124 so as to be incident on an incident face 128 of the optical attenuation device 130. To maintain the compact structure, optical attenuation device 130 is positioned above or below the plane, which contains the compact planar array of optical elements described above. Thus, incident face 128 is parallel to the plane, thus mirror 126 receives light moving along beam path 114 and redirects it perpendicular to beam path 114 to be introduced onto incident face 128.

Once the wavelengths of channel beams 124 are attenuated by optical attenuation device 130 (as described below), they are reflected back to mirror 126 and through the optical system, which basically acts in reverse to reintegrate the wavelengths. That is, lenses 110 and 112 focus the channel beams so that the disparate wavelengths are reintegrated at wavelength separator 108. Subsequently, the reintegrated wavelengths return through polarization splitter 104 and polarization rotator 106 to form a non-polarized or random polarized output signal set 18. This process can be seen schematically in FIG. 8 where a first reintegrated wavelength beam 132 has its polarization rotated to be orthogonal to a second reintegrated wavelength beam 134. Subsequently, these two orthogonal beams are reintegrated to produce an output signal set 135 of non-polarized light.

Optical attenuation device 130 can be a liquid crystal cell array (such as a liquid crystal panel, a liquid crystal on silicon panel, or a digital light processing panel) that includes a number of separate polarizing modulation cells, e.g., pixel cells. Each pixel cell can be independently controlled such that the pixel either rotates the polarization orientation of light incident on the pixel or does not change the polarization. As is known in the art, the optical system is configured such that only light polarized in one of two orthogonal directions will pass back through the optical system. Thus, the incoming light (incoming signal set 14) which is all polarized in the same direction by passing through polarization rotator 106 (for example s polarization) will pass through the remaining part of the optical system to optical attenuation device 130. However, light reflected by optical attenuation device 130 can have p polarization because of polarization rotation at optical attenuation device 130. This p polarization light would not pass back through the optical system. By this method, channel beams 124 incident onto incident face 128 can be attenuated at optical attenuation device 130 to flatten the signal set.

In preferred embodiments, optical attenuation device 130 does not just rotate the light polarization between two orthogonal orientations. That is, if the incident light is s-polarized, optical attenuation device 130 does not either rotate the light to being totally p-polarized or leave the light as being totally s-polarized. Rather, the preferred optical attenuation device 130 can rotate the light so as to have both a non-zero s-polarized component and a p-polarized component. Thus, the optical attenuation device can take an incident s-polarized beam and rotate it to have from a 0% to 100% p-polarized component.

Figure 9:
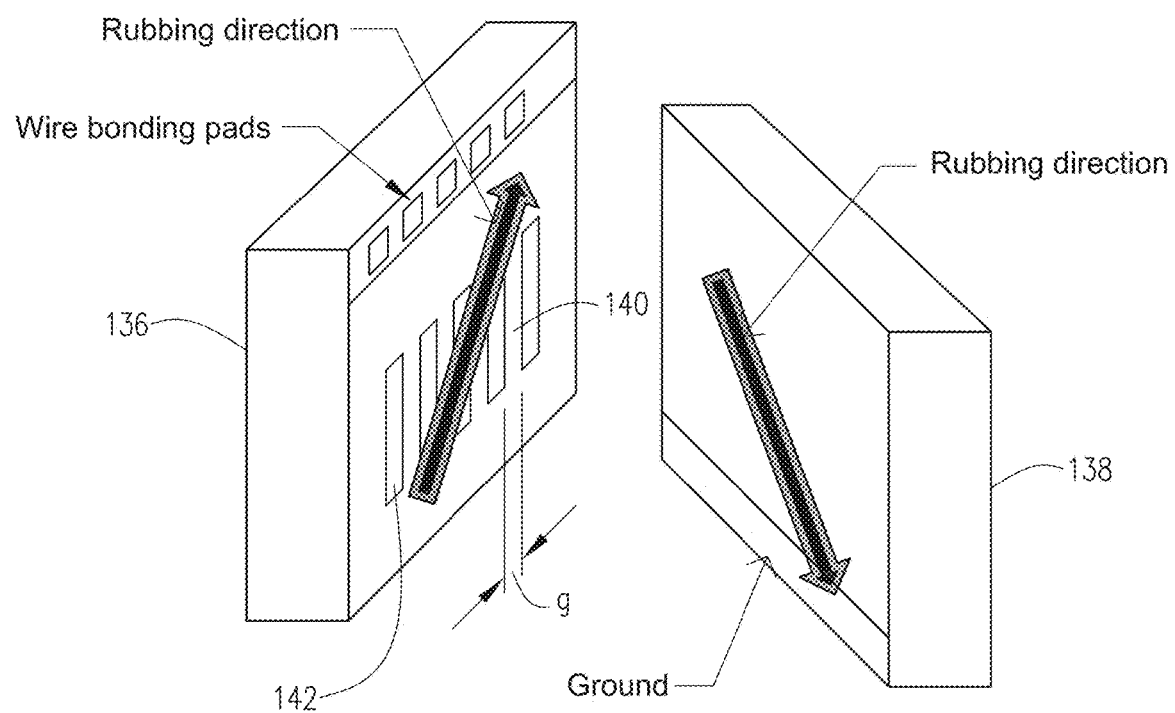
FIG. 9 is a schematic illustration of a liquid crystal array suitable for use as the optical attenuation device of the current disclosure.

As can be seen from FIG. 9, the liquid crystal array can comprise a pixel panel 136 and a ground panel 138. Pixel panel 136 can have a metal coating, such as a gold coating, with the coating etched away to create inter-pixel gaps 140. Accordingly, pixel panel 136 comprises a matrix of pixels 142 with pixels 142 separated by inter-pixel gaps 140. The pixel matrix typically has a size large enough to cover the entire dispersed spectrum from wavelength separator 108. For example, the optical attenuation device 130 can comprise a pixel panel 136 having at least 40 pixels (in some embodiments at least 50 pixels) wherein each pixel is independently electrically driven, that is, electrically controlled independently from the other pixels. Typically, each pixel position in the pixel matrix is associated with a frequency in the dispersed spectrum from wavelength separator 108. The variable optical attenuation range of each pixel can reach 0 to 30 db.

Due to the channel beam having Gaussian distribution in free space, the DGE spectrum response is the convolution of Gaussian beam with pixel filter function. A smaller pixel size will result in a larger spectrum gradient and better performance on flex grid but adds more complexity on the driving system For example, the spectrum gradient can be at least 5 db/nm.

The matrix of pixels 142 can be associated with a frequency in the dispersed spectrum. Due to the channel beam having a Gaussian distribution in free space, the DGE spectrum response is the convolution of the Gaussian beam with a pixel filter function. A smaller pixel size will result in a larger spectrum gradient and better performance on the flex grid but add more complexity on the driving system. For example, the spectrum gradient in some applications will be greater than 5 db/nm.

Figure 10:
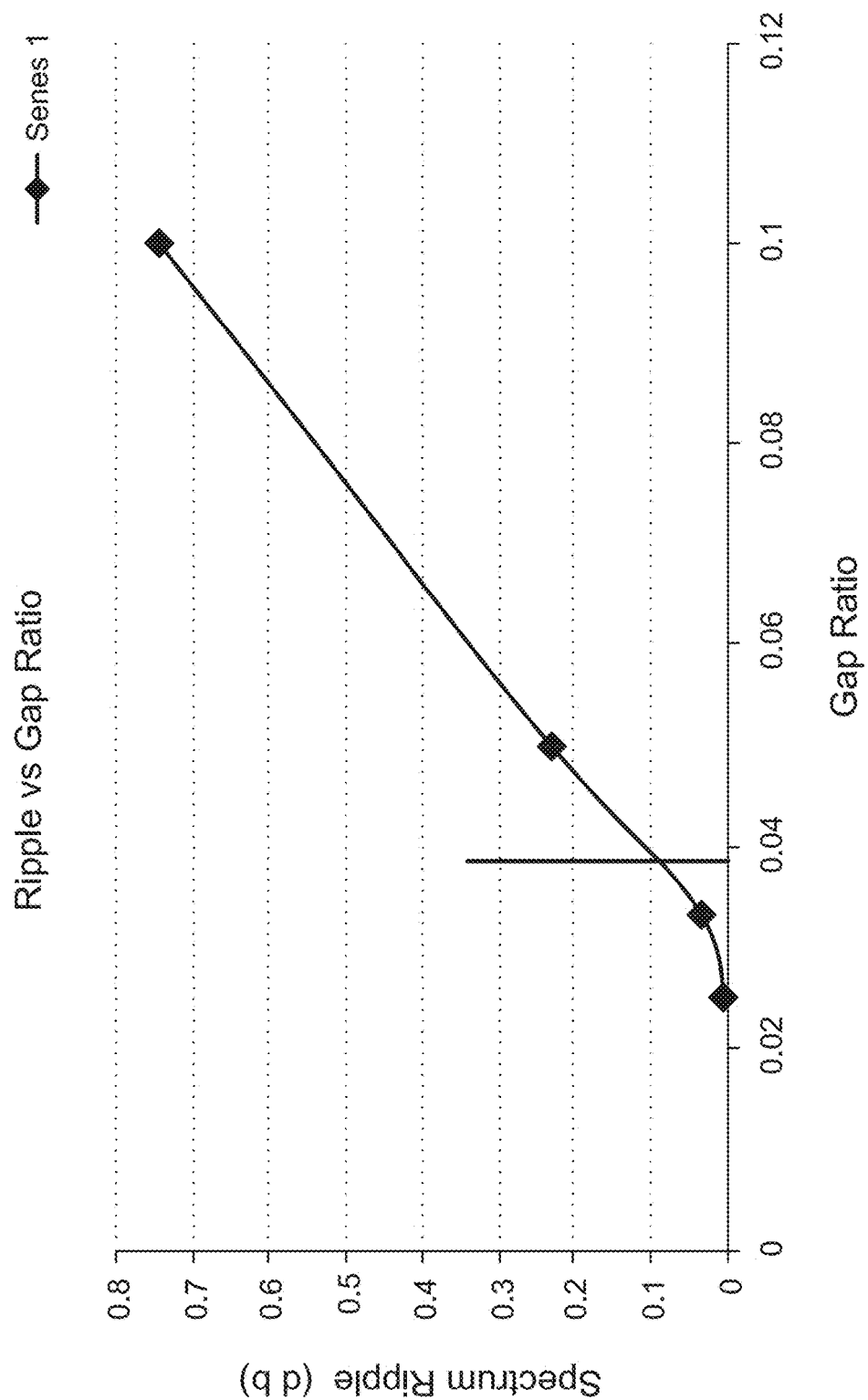
FIG. 10 is a diagram of ripple versus gap ratio for the disclosed DGE.

The matrix of pixels have an inter-pixel gap size "g", which represents the distance between neighboring pixels. Further, a channel beam will have a diameter "d" which represents the diameter of the channel beam orthogonal to incident face 128 of the optical attenuation device 130. It has been discovered that the ratio of gap size "g" to the diameter "d" of the channel beams at the incident face 128 determines the ripple present in the output signal set. That is, the smaller the gap ratio (g/d) the smaller the ripple present in the output signal set. As can be seen from FIG. 10, the smaller the gap ratio the smaller the resultant ripple in the output signal set with gap ratios of less than 0.04 resulting in ripples of less than 0.1 db.

In accordance with this disclosure, the optical attenuation device and the optical system are configured such that the ratio g/d is less than or equal to about 0.06, and more typically is less than or equal to 0.04 or less than or equal to 0.037. Accordingly, the DGE of this disclosure can generate output signal sets with ripple increases of most generally +/−0.4 db or less, and more typically +/−0.2 db or less, or +/−0.1 db or less. In some embodiments, the rippling added at each stage can be from +/−0.02 db to +/−0.1 db. Typically, the gap size "g" will be substantially the same for the entire matrix of pixel and the channel beam diameter will be the same for all the channel beams incident on incident face 128. However, the gap size across the pixel matrix can vary and/or the channel beam diameter can vary for different channel beams, as long as any given set of pixels and its associated channel beam the gap size and beam diameter meet the afore described ratio.

Figure 11:
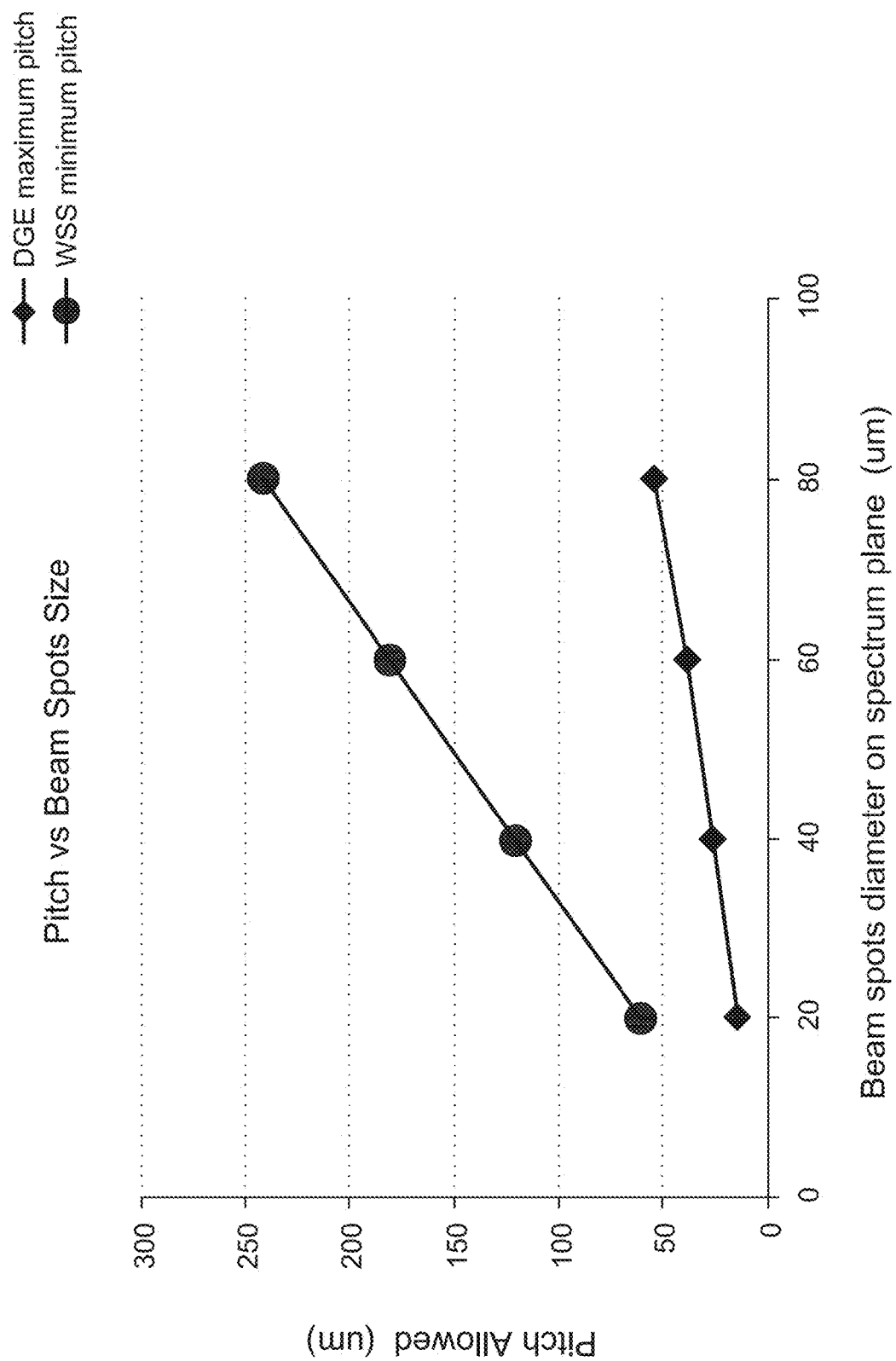
FIG. 11 is a diagram illustrating a comparison between prior art wavelength selective switches and the current dynamic gain equalizer.

FIG. 11 illustrates a comparison between a prior art wavelength selective switch (WSS) and the current dynamic gain equalizer (DGE). To operate effectively, the WSS systems have to have a minimum p/d ratio of greater than 3 (here "p" is the pitch of the electrodes), which results in a chromatic dispersion (CD) in inter-pixel gap area reach of ±100 ps/nm. The DGE systems in accordance with the current disclosure operate with a maximum p/d ratio of 1 or less, and typically in the range of from 0.68 to 1. Further, the matrix is configured to have a CD from about 184,000 GHz to about 196,000 GHz (or across the entire C-band and L-band) of no greater than ±10 ps/nm,

EXAMPLES

In the following examples, a DGE system in accordance with the above description was tested. The DGE had a g/d ratio of about 0.5. The optical attenuation device was a liquid crystal panel. The liquid crystal panel was in ECB (electronically controlled birefringence) reflective mode, where applied voltage is used to change the tilt of the liquid crystal molecules. As a result, the birefringence is changed as a function of the tilt angle. An optical spectrum analyzer was used to measure the resultant ripple effect over wavelength for the DGE at temperatures of 15° C., 20° C., 25° C., 30° C., 35° C. and 40° C.

FIGS. 12-15 illustrate the current DGE's performance in relation to the C-band frequencies (about 191,560 GHz to about 195,942 GHz corresponding to about 1565 nm to about 1530 nm).

Figure 12:
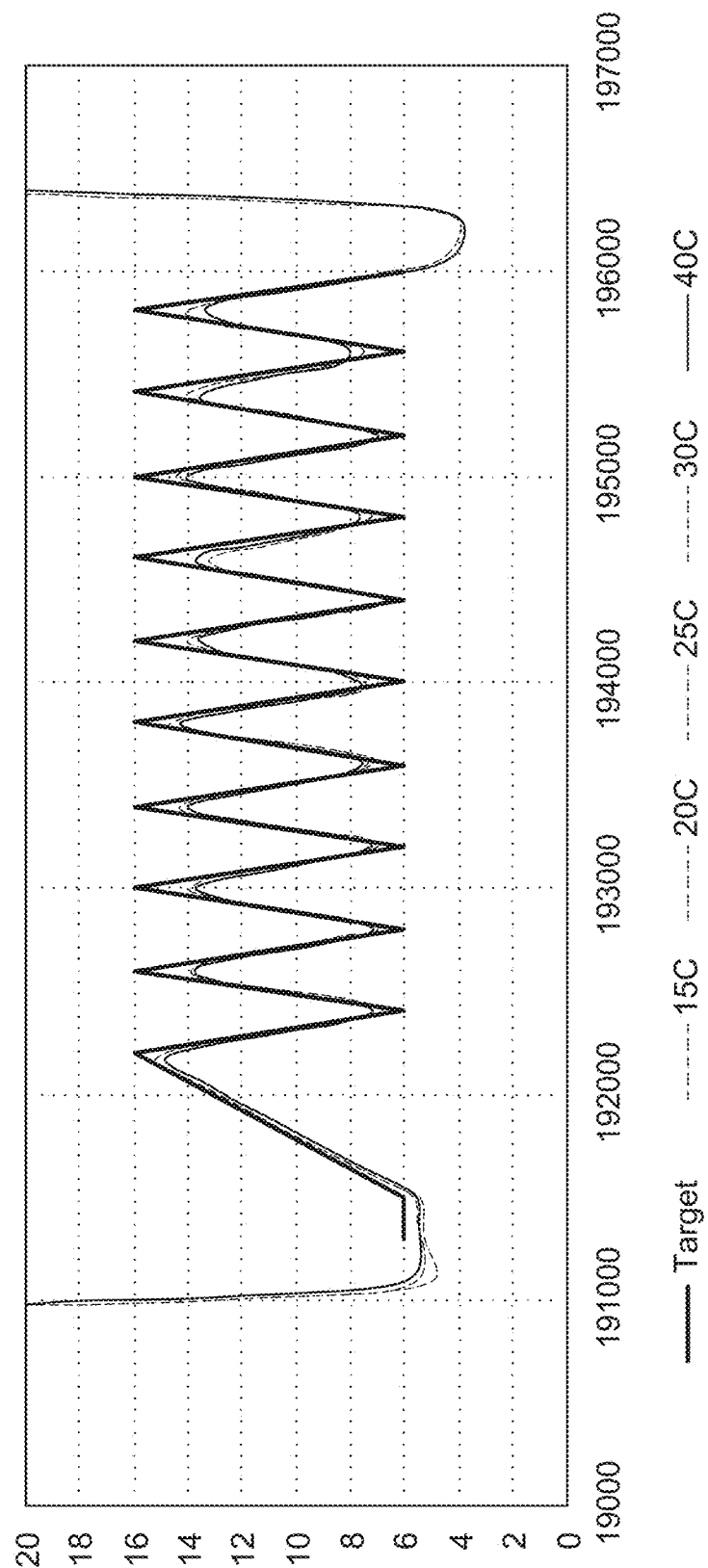
FIGS. 12 and 13 are diagrams illustrating the capability of the current DGE to compensate for a fixed gain flat filter over C-band frequencies.

FIG. 12 illustrates the capability of the DGE to compensate an exaggerated fixed gain flat filter (GFF) leftover ripple. The device compensation slope can easily reach 5 db/nm. The DGE results compare favorably with the calculated target curve.

Figure 13:
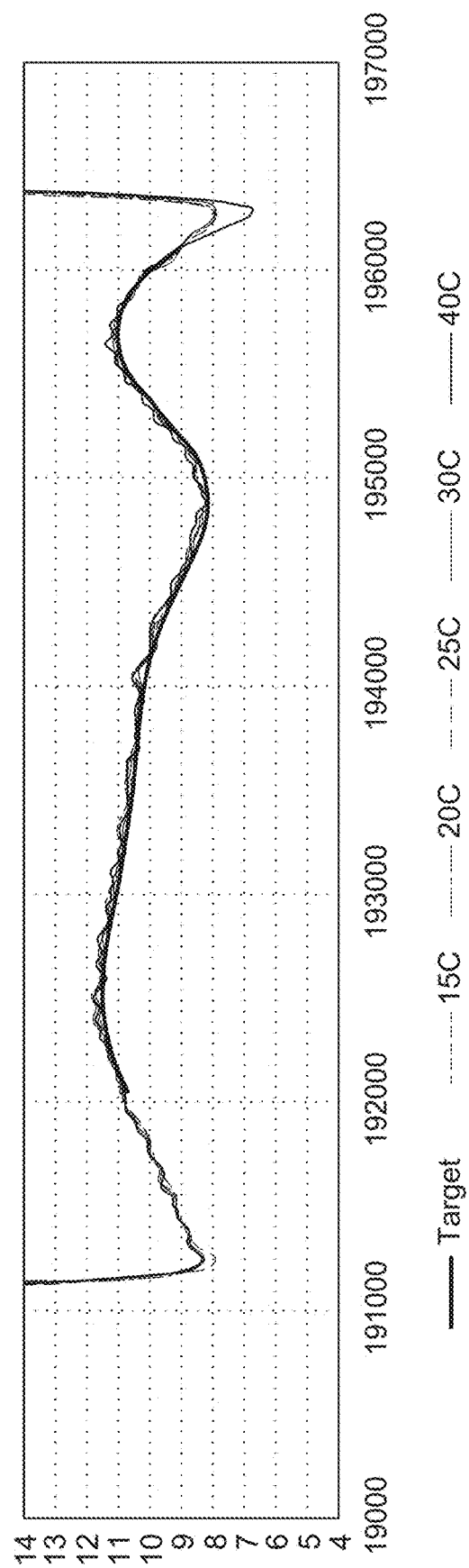

FIG. 13 illustrates the C-band GFF filter function created by tuning DGE 64 pixels. As can be seen, the DGE operation at the various temperatures closely match the calculated target curve with minimal rippling.

Figure 14:
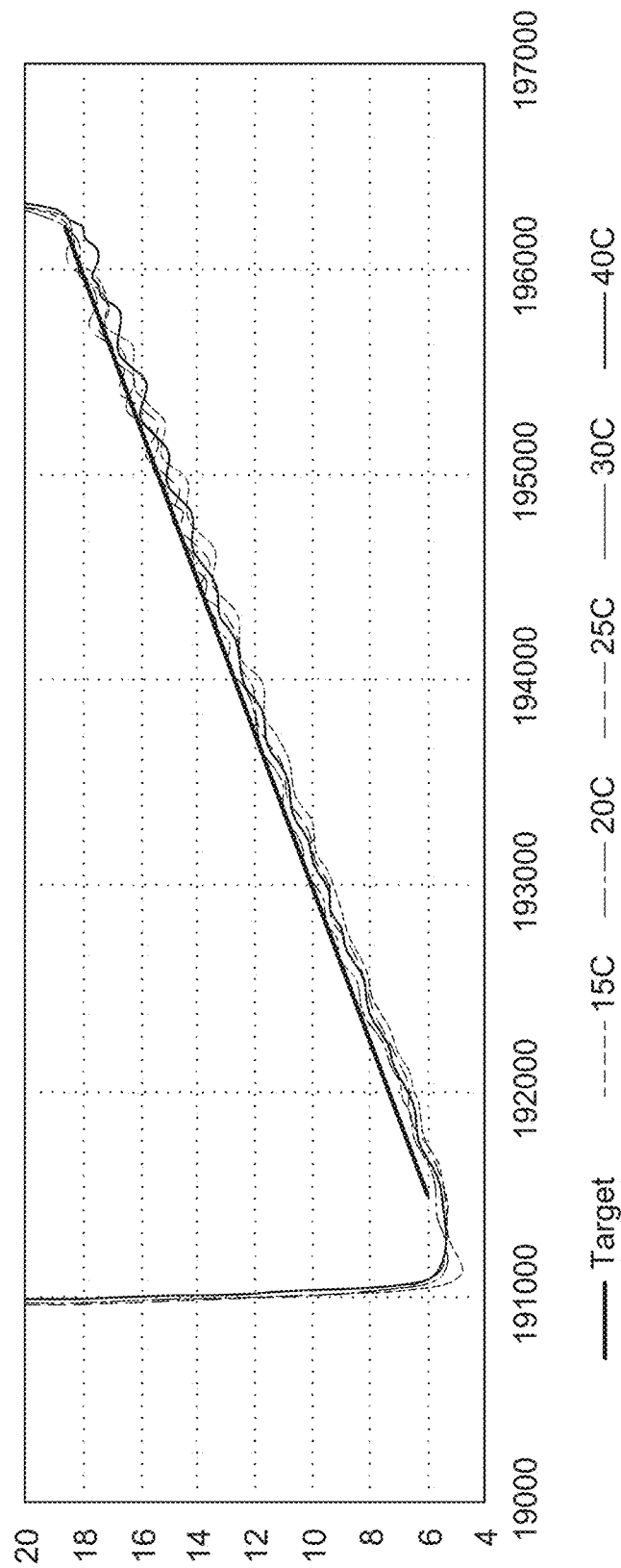
FIGS. 14 and 15 are diagrams illustrating the capability of the current DGE to compensate for an EDFA-type amplifier over C-band frequencies.
Figure 15:
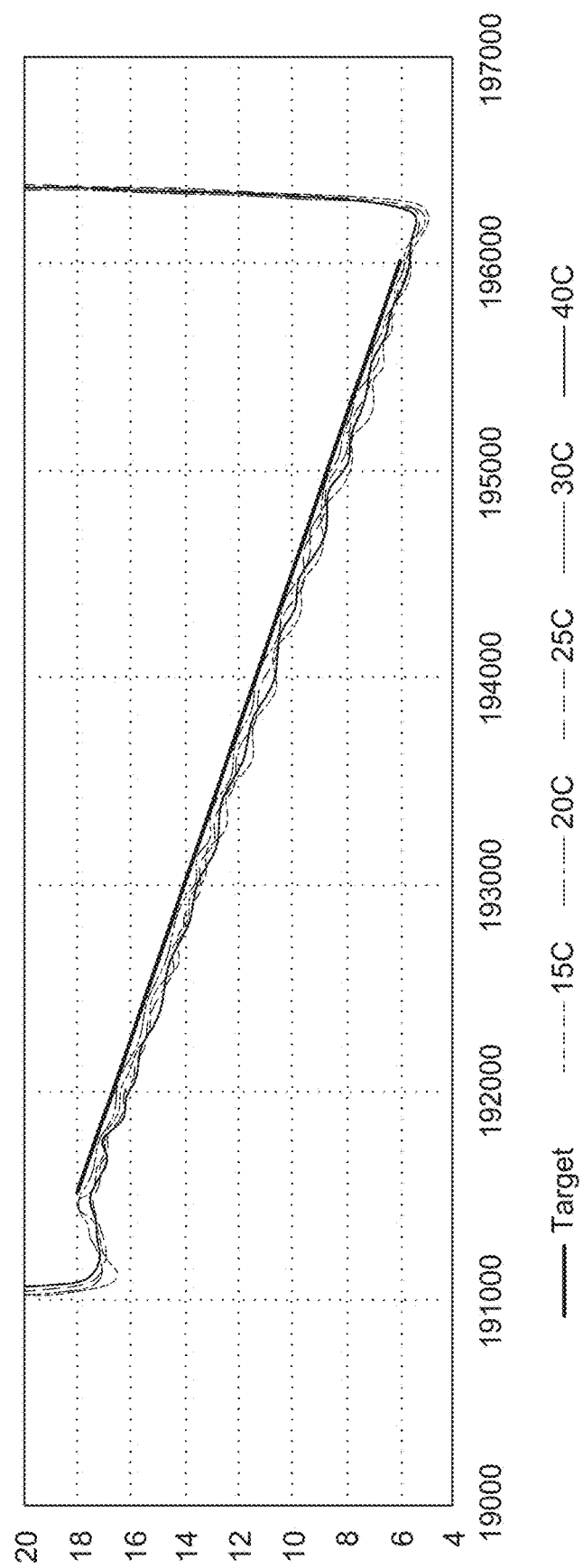

FIGS. 14 and 15 illustrate the DGE flattening or compensating for an EDFA-type amplifier over C-band frequencies. As can be seen, the DGE flattened the signal and introduced a ripple of less than +/−0.4 db, and more in most circumstances +/−0.2 db or less, or +/−0.1 db or less over the calculated target curve.

FIGS. 16-19 illustrate the current DGE's performance in relation to the L-Band frequencies (about 184,487 GHz to about 191,560 GHz corresponding to about 1625 nm to about 1565 nm).

Figure 16:
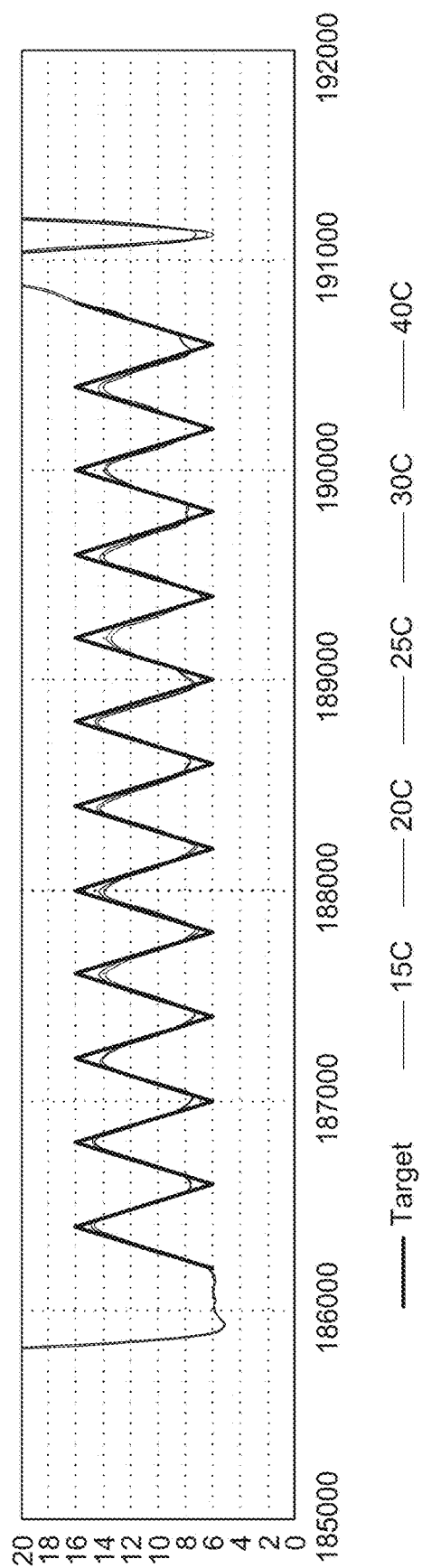
FIGS. 16 and 17 are diagrams illustrating the capability of the current DGE to compensate for a fixed gain flat filter over L-band frequencies.

FIG. 16 illustrates the capability of the DGE to compensate an exaggerated fixed gain flat filter (GFF) leftover ripple. The device compensation slope can easily reach 5 db/nm. The DGE results compare favorably with the calculated target curve.

Figure 17:
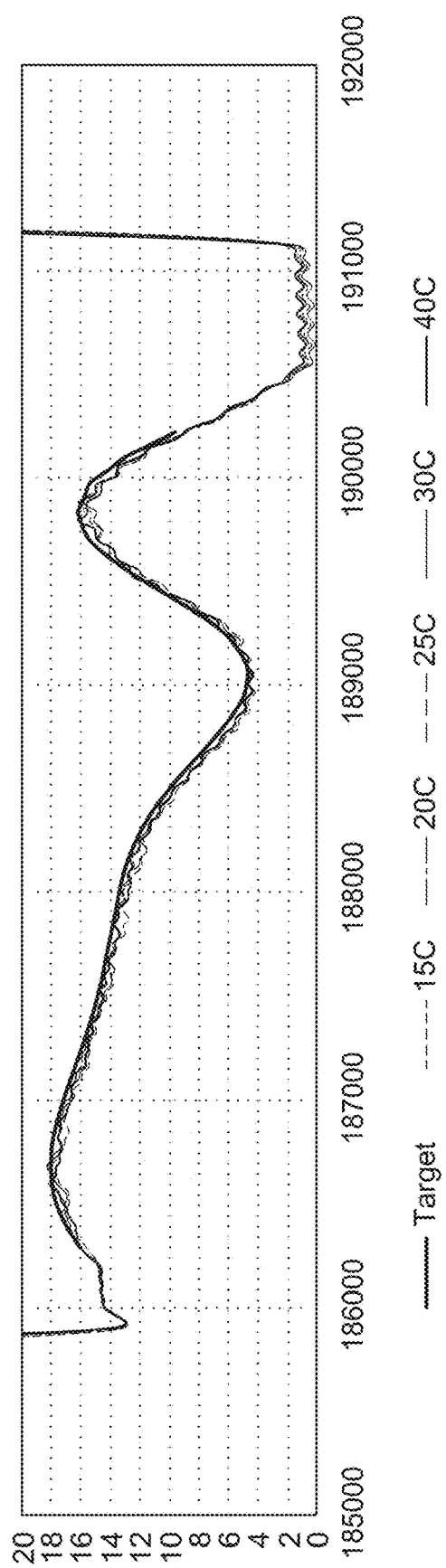

FIG. 17 illustrates the C-band GFF filter function created by tuning DGE 64 pixels. As can be seen, the DGE operation at the various temperatures closely match the calculated target curve with minimal rippling.

Figure 18:
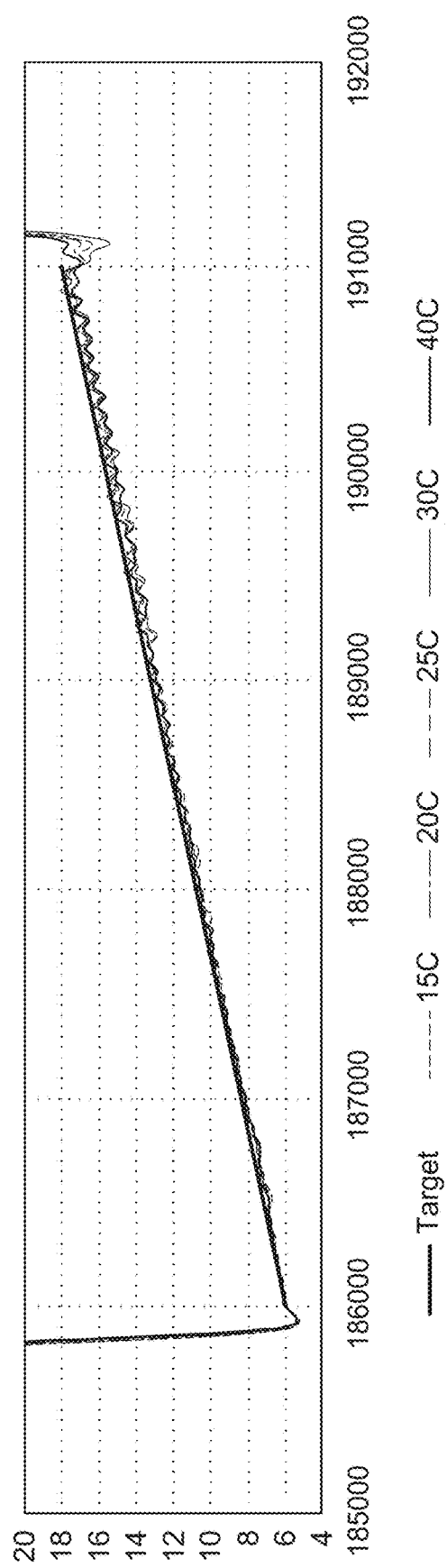
FIGS. 18 and 19 are diagrams illustrating the capability of the current DGE to compensate for a Raman-type amplifier over L-band frequencies.
Figure 19:
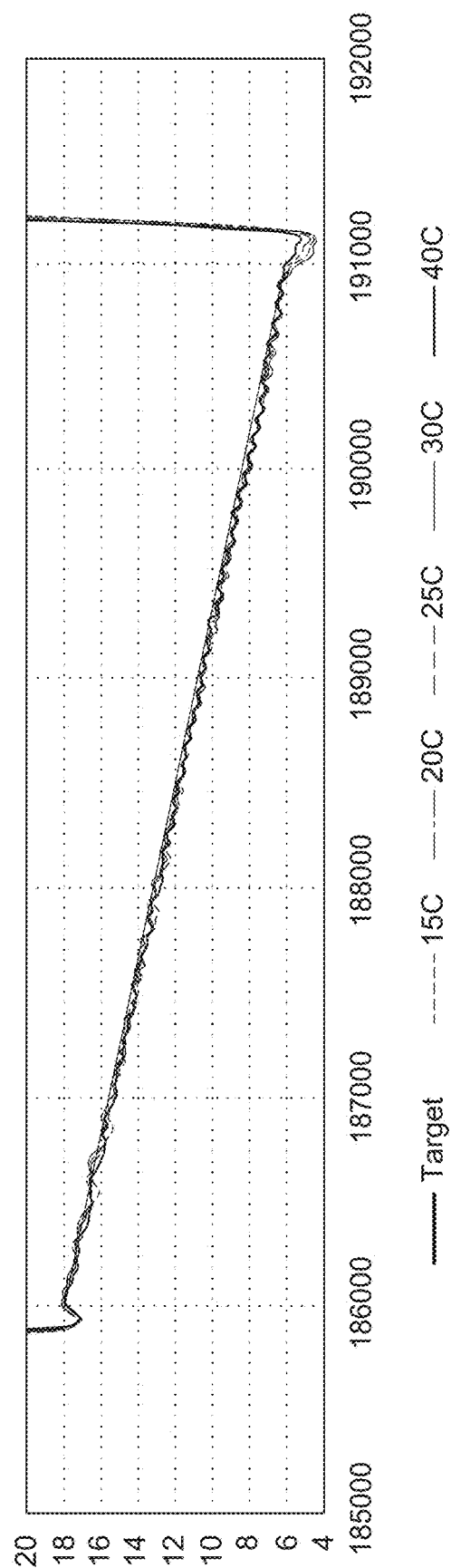

FIGS. 18 and 19 illustrate the DGE flattening or compensating for a Raman-type amplifier over L-band frequencies. As can be seen, the DGE flattened the signal and introduced a ripple of less than +/−0.4 db, and more in most circumstances +/−0.2 db or less, or +/−0.1 db or less over the calculated target curve.

Conventional systems have been unable to provide dynamic gain equalization over both C-band and L-band frequencies and thus have not been applicable to both EDFA-type amplifiers and Raman-type amplifiers. As can be realized from the above Examples, the current dynamic gain equalization systems and methods provide equalization over the entire C-band and L-band while suppressing the rippling normally experienced in conventional systems. Accordingly, a single DGE in accordance with this disclosure can be used for equalization of signals from EDGA-type amplifiers and Raman-type amplifiers while avoiding the rippling of prior art systems.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A dynamic gain equalizer for an optical communication path, comprising:
    an input port to receive an input signal set from the optical communication path, the input signal comprises a plurality of optical signals, each optical signal being at a respective one of a plurality of wavelengths with each of the wavelengths having a power level;
    an optical system configured to separate the input signal set into spatially separated channel beams based on wavelength and based on polarization components for each of the wavelengths, wherein each of the channel beams has an optical power, and wherein the optical system is further configured to reintegrate an attenuated channel beam set so as to produce an output signal set, wherein the output signal set has a flattened spectrum from the input signal set such that the power levels across the plurality of wavelengths has been equalized;
    an optical attenuation device configured to receive the channel beams incident on the optical attenuation device from the optical system, attenuate the optical power of one or more of the channel beams so as to produce the attenuated channel beam set, and transmit the attenuated channel beam set to the optical system; and
    an optical output port configured to transmit the output signal set from the optical system to the optical communication path.

2. The dynamic gain equalizer of claim 1, wherein the optical attenuation device comprises a matrix of at least 40 pixels configured such that each pixel can be independently electrically driven and each pixel has a variable optical attenuation from 0 to 30 db.

3. The dynamic gain equalizer of claim 2, wherein each of the channel beams has a diameter "d" when the channel beam is incident on the optical attenuation device.

4. The dynamic gain equalizer of claim 3, the matrix of pixels are separated by a gap distance "g" and the optical attenuation device and the optical system are configured such that the ratio g/d is less than or equal to 0.06.

5. The dynamic gain equalizer of claim 4, wherein the optical attenuation device and the optical system are configured such that the ratio g/d is less than or equal to 0.04.

6. The dynamic gain equalizer of claim 4, wherein the optical attenuation device and the optical system are configured such that the ratio g/d is less than or equal to 0.037.

7. The dynamic gain equalizer of claim 4, wherein the optical system comprises:
    a compact planar array of optical elements, which planar array is configured to separate the input signal set into the spatially separated channel beams and configured to reintegrate the attenuated channel beam set so as to produce the output signal set, and wherein the optical elements are arranged such that the planar array is a folded optical system having a zigzag beam path laying in a single plane; and
    a mirror configured to redirect the spatially separated channel beams so as to be incident on an incident face of the optical attenuation device, wherein the incident face is parallel to the single plane.

8. The dynamic gain equalizer of claim 7, wherein the compact planar array of optical elements comprises:
   a collimator configured to collimate the input signal set and transmit the input signal set along the beam path;
   a polarization splitter disposed in the beam path and configured to split the input signal set into a pair of polarization components for each of the wavelengths;
   a polarization rotator disposed in the beam path and configured to rotate one of the pair of polarization components;
   a wavelength separator disposed in the beam path and configured to spatially separate the plurality of wavelengths into the channel beams; and
   one or more lenses disposed within the beam path and configured to focus the channel beams such that the channel beams have the diameter "d" when the channel beams are incident on the optical attenuation device.

9. The dynamic gain equalizer of claim 8, wherein the optical attenuation device and the optical system are configured such that the ratio g/d is less than or equal to 0.04.

10. The dynamic gain equalizer of claim 8, wherein the optical attenuation device and the optical system are configured such that the ratio g/d is less than or equal to 0.037.

11. A method of manipulating an input signal set formed from a plurality of optical signals, each optical signal being at a respective one of a plurality of wavelengths with each of the wavelengths having a power level, the method comprising:
   separating the input signal set into spatially separated channel beams based on wavelength and based on polarization components for each of the wavelengths to form a dispersed spectrum, wherein each of the channel beams has an optical power; and
   attenuating the optical power of one or more of the channel beams so as to produce an attenuated channel beam set, wherein the step of attenuating the optical power comprises impinging the channel beams on a surface of an optical attenuation device, wherein the optical attenuation device comprises a matrix of at least 40 pixels, and wherein each position on pixel array is associated with a frequency in the dispersed spectrum with a p/d ratio less than 1, and wherein for the matrix has a chromatic dispersion of less than 10 ps/nm across from about 184,000 GHz to about 196,000 GHz.

12. The method of claim 11, wherein each of the channel beams has a diameter "d" when the channel beam is incident on the optical attenuation device.

13. The method of claim 12, the matrix of pixels are divided by a gap distance "g" and the optical attenuation device and the optical system are configured such that the ratio g/d is less than or equal to 0.06.

14. The method of claim 13, wherein the ratio g/d is less than or equal to 0.04.

15. The method of claim 14, wherein the ratio g/d is less than or equal to 0.037.

16. The method of claim 13, further comprising:
   reintegrating the attenuated channel beam set so as to produce an output signal set, wherein the output signal set has a flattened spectrum from the input signal set such that the power levels across the plurality of wavelengths has been equalized.

17. The method of claim 16, wherein the output signal set has an increase in spectral ripple over the input signal set that is 0.1 db or less.

18. The method of claim 17, wherein the ratio g/d is less than or equal to 0.04.

19. The method of claim 17, wherein the ratio g/d is less than or equal to 0.037.

* * * * *